May 29, 1934.    J. L. CREVELING    1,960,527
LUBRICATING MEANS
Filed Jan. 28, 1925
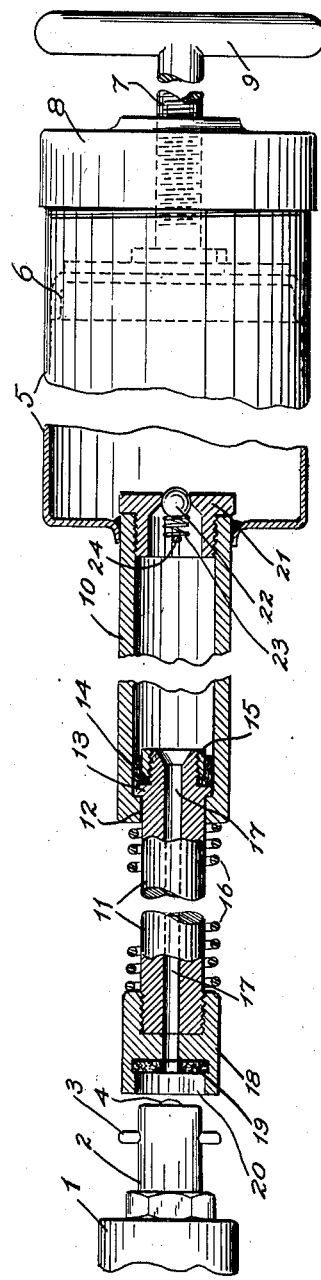
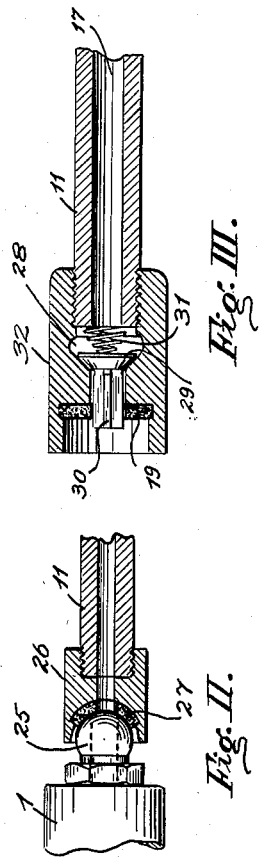
INVENTOR.
John L. Creveling Patented May 29, 1934

1,960,527

UNITED STATES PATENT OFFICE 1,960,527

LUBRICATING MEANS

John L. Creveling, near Tucson, Ariz., assignor to The Lubrication Corporation, South Bend, Ind., a corporation of Delaware Application January 28, 1925, Serial No. 5,270

26 Claims. (Cl. 221—47.4)

My invention pertains to that class of lubricating means employed for forcing a lubricant, such as oil or grease, between bearing surfaces under pressure and has for its particular object to provide simple and effective means whereby this may be easily and quickly accomplished, and whereby a very high pressure, when necessary, may be exerted upon the lubricant to cause the same to be forced between the surfaces as desired.

Fig. I is a partial section and partial elevation of a structure comprehending one embodiment of my invention;

Fig. II is a partial elevation and partial section showing a modification that may be made in the structure of Fig. I; and Fig. III is a partial section of a modification which may be made in the structure of Fig. I.

Referring to the drawing, 1 represents a portion of a hollow boss or member which is provided with a suitable duct or passage communicating with the parts to be lubricated. 2 is a nipple connected with the member 1 and, in this instance, is indicated as an ordinary "Alemite" nipple provided with the engaging pins 3 and ball-valve 4. This nipple is now so well-known in the art that no further description is deemed necessary. 5 is a lubricant compressor adapted to hold either oil or grease and provided with a piston, indicated in dotted lines at 6, which may be moved so as to force the lubricant out of the compressor by rotating the screw-threaded stem 7 carried by the cap 8 and rotatable as by means of the handle indicated at 9. 10 is a tube or cylinder communicating with the interior of the compressor 5 and having within the same a tubular plunger 11 making a slip-fit, as indicated at 12, and restrained in its outward movement as by a flange 13. This plunger is preferably provided with a cup-leather packing or other suitable type of piston packing, as indicated at 14, which may be held in place as by the nut 15. 16 is a compression-spring which may be employed to hold the plunger 11 in the position indicated in the drawing. The plunger 11 is made up in the fitting 18 provided with a soft gasket, such as a leather washer 19, within the recess 20, while the bore 17 of the plunger 11 registers with suitable openings through parts 18 and 19. 21 is a bushing which may be screwed into the bore of the nipple 10 and may be used to carry the ball-valve 22 held in place as by spring 23 which is held in its operative position as by pin 24.

In Fig. II the member 1 is shown as provided with a nipple 25 having a spherical head, while the member 26, carried by the plunger 11 in place of the member 18 of Fig. I, is provided with a gasket 27 presenting a spherical surface which may be placed against the nipple 25, as shown in the drawing.

In Fig. III the plunger 11 is provided with a member 32 in place of 18 in Fig. I, and the member 32 is provided with a cavity 28 which may be closed by the valve 29 which may be opened by pressure against the usual star-shaped or winged stem 30, while the said valve is normally held seated by the spring 31.

An operation of my invention is substantially as follows:

If one wish to inject a lubricant, as for example grease, into the fitting 2 of Fig. I, he has merely to fill the compressor 5 in the usual manner and turn the handle 9 until the plunger 6 forces the lubricant past the valve 22 into the bore of the small area cylinder 10 and through the bore 17 of the plunger 11 until some of the lubricant is present at or near the end of the said bore. Then he has merely to place the recess 20 over the end of nipple 2 and press the gasket 19 against the end of the said nipple 2 by pushing upon the compressor 5 so as to cause the compressor 5 to advance toward the nipple 2. This will cause the plunger 11 to move in the cylinder 10 and force the lubricant through the duct 17 and into the nipple 2, and thence to the parts to be lubricated. Owing to the small area of the bore of cylinder 10 and the small area of the piston operating therein, a very high pressure may be reached by manually pushing the gun toward the fitting, as above outlined. In practice, I make the area of this piston a little larger than the abutting surfaces of the nipple 2 and gasket 19 and thereby secure a tight joint between the said gasket 19 and the nipple to which the gun is applied. If one wish to inject more lubricant than one travel of the plunger 11 within the cylinder 10 accomplishes, he has merely to fill the cylinder 10 again by turning the handle 9 and proceed as before.

With that modification indicated in Fig. II, the operation is the same as that outlined above with reference to Fig. I, except that inasmuch as the abutting surfaces of the nipple 25 and the gasket 27 are spherical a tight joint will be preserved even if the gun be not held directly in line with the nipple 25 but swung out of line within reasonable limits.

In that modification indicated in Fig. III, the operation will be the same as that outlined with respect to Fig I, except that when the gun is not in use the valve 29 will close and restrain any lubricant in the bore 17 from issuing from the gun; and it will be noted that as the fitting 32 is placed upon the fitting 2 the wings 30 of the valve 29 span a somewhat greater area than the orifice closed by the ball-valve 4 of Fig. I, and, in this way, the valves 4 and 29 are both unseated as soon as one pushes the gun against the fitting 2, and then the lubricant may be forced into the fitting 2, as indicated with reference to Fig. I. This type is particularly applicable for the use of oil or any more or less fluid lubricant which might tend to issue from the gun while not in use.

In the structure here portrayed it will be noted that, while a heavy pressure may be produced within the cylinder 10 and applied to the lubricant to be forced into the bearing, this pressure is not exerted upon the barrel of the compressor 5 or its piston, on account of the valve 22. However, when these parts are adapted to withstand a high pressure, the valve 22, of course, may be omitted, as the lubricant is substantially incompressible.

From the foregoing it will be noted that I have produced a lubricating means having somewhat the nature of an ordinary grease-gun with which a lubricant may be forced between bearing surfaces under high pressure and that the application may be made very rapidly and without the necessity of mechanically uniting the gun with the nipple, as by means of bayonet-joints, screw-threads or other such devices, since the gun itself effects a fluid-tight connection with the nipple whenever it is used in connection therewith.

I do not wish in any way to limit myself to the exact constructions or modes of operation employed above merely to illustrate embodiments of my invention as it is obvious that wide departure in details as well as operation may be made without departing from the spirit and scope of my invention which is as set forth in the following claims.

I claim:

1. Lubricating means comprehending lubricant containing means, means for expelling a lubricant therefrom, and means for increasing the expelling pressure upon said lubricant by manually pushing said containing means toward a part to be lubricated.

2. Lubricating means comprehending containing means, means for expelling a lubricant therefrom, means for conveying said lubricant to a part to be lubricated including means for increasing the expelling pressure upon said lubricant when said conveying means is merely placed against a part to be lubricated and the containing means is manually pressed toward said part.

3. Lubricating means comprehending containing means, expelling means adapted to expel a lubricant therefrom under pressure, and means for increasing the expelling pressure upon said lubricant including a device in operative communication with said containing means operated by manual pressure exerted against the containing means in a longitudinal direction.

4. The combination with a nipple connected with a part to be lubricated, of means for forcing a lubricant through said nipple comprehending lubricant containing means, and means for increasing the pressure upon said lubricant and simultaneously effecting a pressure-tight connection between said nipple and said pressure increasing means upon manually pressing the containing means toward said nipple.

5. A lubricant compressor comprising a barrel, means in said barrel for placing a lubricant therein under a substantial pressure, a cylinder communicating with said barrel, and means communicating with said cylinder for engaging a lubricant nipple and actuated by manual pressure exerted against said barrel and toward the nipple for placing lubricant in said cylinder under increased pressure.

6. Lubricating means comprehending containing means, means for expelling a lubricant therefrom, a cylinder of relatively small area communicating with said containing means, and a plunger operable within said cylinder and provided with a lubricant conveying duct therethrough, combined with lubricant receiving means and means associated with the end of said plunger whereby a pressure-tight joint is automatically made between said duct and said receiving means when the said associated means is placed against the receiving means and manual pressure exerted against the containing means in a longitudinal direction.

7. Lubricating means comprehending containing means, a cylinder of relatively small area communicating with said containing means, a plunger operable within said cylinder and provided with a lubricant conveying duct therethrough, combined with lubricant receiving means, and means associated with the end of said plunger whereby a pressure-tight joint is automatically made between said duct and said receiving means when the said associated means is placed against the receiving means and manual pressure exerted against the containing means to cause said plunger to operate in said cylinder and expel the lubricant therefrom under increased pressure.

8. Lubricating means comprehending a lubricant container, a piston therein for expelling lubricant therefrom, manually operable means for moving said piston, a high pressure cylinder of relatively small area communicating with said container and in alignment therewith and a plunger within said cylinder for producing high pressure upon the lubricant and having a lubricant conveying duct therethrough, said plunger being provided at its outer extremity with means for making a pressure-tight joint against lubricant receiving means when said plunger has its said outer extremity means merely placed against the same and manual pressure is exerted upon said manually operable means.

9. A compressor for injecting lubricant into a fitting comprehending a chamber for containing a supply of lubricant, means for manually exerting pressure thereupon tending to expel said lubricant, and means receiving lubricant from said chamber and expelling the same into said fitting under high pressure when a portion thereof is merely placed against said fitting and the opposite end of said compressor pushed toward said fitting.

10. A compressor for injecting lubricant into a receiving fitting including a lubricant conveying member adapted to be placed against said fitting, a high pressure chamber, means for forcing lubricant from said chamber under high pressure into said fitting, a low pressure chamber for containing a supply of lubricant, and means for forcing said lubricant into the high pressure chamber, said elements being so arranged that when said member is merely placed against the fitting and the part of the compressor most remote therefrom is pushed toward said fitting lubricant will be forced from the high pressure chamber into said fitting.

11. Lubricating means including a lubricant receiving member having a passageway for lubricant, a compressor for supplying lubricant to said receiving member including a container for lubricant, a discharge tube in tandem with and reciprocable with respect to said container, means interposed between and effecting communication between said container and said discharge tube for forcing lubricant under pressure through said discharge tube when said container is reciprocated relatively to said discharge tube, means for causing lubricant to pass from said container to said forcing means, and means carried by the outer end of said discharge tube for automatically making sealed contact with said receiving member, said sealed contact being maintained by the pressure exerted in moving said container relatively to said discharge tube.

12. Lubricating means including a lubricant receiving member having a passage-way for lubricant, a compressor for supplying lubricant to said receiving member including a container for lubricant, a discharge tube in tandem with and reciprocable with respect to said container, means interposed between and effecting communication between said container and said discharge tube for forcing lubricant under pressure through said discharge tube when said container is reciprocated relatively to said discharge tube, means for causing lubricant to pass from said container to said forcing means, and means carried by the outer end of said discharge tube for automatically making sealed contact with said receiving member, said sealed contact being maintained by the pressure exerted in moving said container relatively to said discharge tube.

13. A lubricant compressor comprising a container for lubricant, a cylinder communicating with said container, elements at opposite ends of said compressor for receiving oppositely directed thrusts, one of said elements having a passageway communicating with said cylinder and said container, means actuated by a thrust imposed upon one of said elements for discharging lubricant from said cylinder through said passageway, and means movable with respect to said cylinder for pressing the lubricant in said container into said cylinder.

14. A compressor for forcing lubricant into a receiving fitting, comprising a member adapted to be placed against said fitting and make a pressure-tight joint therewith, a high pressure chamber communicating with said fitting when said joint is thus made, a low pressure chamber for containing a supply of lubricant, means for moving lubricant therefrom into said high pressure chamber, an element extending beyond the end of said container opposite said member, and means whereby the high pressure joint is maintained and lubricant injected therethrough when said member is placed against the fitting and said element is pressed toward said member.

15. Lubricating means comprehending lubricant containing means, means for expelling a lubricant therefrom, and means in substantially axial alignment with said expelling means for increasing the expelling pressure upon said lubricant and causing the same to be delivered to a part to be lubricated by merely manually pushing said containing means toward said part to be lubricated and for effecting a pressure-tight joint by said pushing.

16. Lubricating means comprehending containing means, expelling means adapted to expel a lubricant therefrom under pressure and means for increasing the expelling pressure upon said lubricant including a device comprising a tube in communication with said containing means and sealing means automatically operated by manual pressure exerted against the containing means and tube in a longitudinal direction.

17. A lubricant compressor comprising a barrel, means in said barrel for placing a lubricant therein under pressure, a cylinder communicating with said barrel, means movable in said cylinder and communicating with said barrel and actuated by manual pressure exerted against said barrel for placing lubricant in said cylinder under increased pressure and conveying the same to a part to be lubricated.

18. Lubricating means comprehending containing means, expelling means adapted to expel a lubricant therefrom under pressure in one direction and means operating upon the lubricant in said direction for increasing the expelling pressure upon said lubricant including a device in operative communication with said containing means operated by manual pressure exerted against the containing means in a longitudinal direction, and automatic sealing means operated by said pressure.

19. The combination with a nipple connected with a part to be lubricated, of means for forcing a lubricant through said nipple comprehending lubricant containing means, means for urging lubricant from the containing means in one direction, and means for increasing the pressure upon said lubricant in the said direction and simultaneously effecting a pressure-tight connection between said nipple and said pressure increasing means upon manually pressing the containing means toward said nipple, said forcing means being freely movable in a direction away from said nipple.

20. A lubricating system comprising a lubricant receiving member having a rounded head provided with a passageway for lubricant, and a compressor for supplying lubricant to said receiver comprising a container for lubricant, a discharge tube reciprocable with respect to said container and operatively communicating with said container, means actuated by the reciprocation of said container with respect to said discharge tube for forcing lubricant under pressure through said discharge tube, means slidably mounted in said container for exerting pressure on the lubricant therein, and means carried by the outer end of said discharge tube for making sealed contact with said rounded head from any one of a plurality of angularly related positions, said last named means being actuated by the pressure exerted against said container toward said member, in reciprocating said container, to maintain a sealed connection with said rounded head.

21. A lubricating system comprising a lubricant receiving member having a head provided with a passageway for lubricant, and a compressor for supplying lubricant to said receiver, comprising a container for lubricant, a discharge tube reciprocable with respect to said container and operatively communicating with said container, means actuated by the reciprocation of said container with respect to said discharge tube for forcing lubricant under pressure through said discharge tube, and means carried by the outer end of said discharge tube for making sealed contact with said head from any one of a plurality of angularly related positions, said last named means being actuated by the pressure exerted against said container toward said member, in reciprocating said container, to maintain a sealed connection with said head.

22. A lubricating system comprising a receptacle for receiving lubricant, said receptacle comprising a spherical head and a compressor comprising a container, means in said container for exerting pressure on the lubricant therein, a cylinder, a discharge tube operatively communicating with said cylinder and terminating in a member having a depression, communicating with said discharge tube, for making sealed contact with said head from any one of a plurality of different angular positions, and means interposed between said cylinder and said tube for placing pressure, greater than the pressure in said container, upon the lubricant discharged through said tube, when a force is applied to said compressor in the direction of said fitting, said force being effective in maintaining a sealed connection between said discharge tube and said head.

23. A lubricating system comprising a lubricant receiving member having a passageway for lubricant, and a compressor for supplying lubricant to said receiver, comprising a container for lubricant, a discharge tube coaxial with, and reciprocable with respect to said container, means interposed between, and effecting operative communication between said container and said discharge tube for forcing lubricant under pressure through said discharge tube when said container is reciprocated relatively to said discharge tube, means for causing lubricant to pass from said container to said forcing means, and means carried by the outer end of said discharge tube for making sealed contact with said receiving member from any one of a plurality of different angularly related positions, said sealed contact being maintained by the pressure exerted in moving said container relatively to said discharge tube.

24. A lubricating system comprising a lubricant receiving member having a passageway for lubricant, and a compressor for supplying lubricant to said receiver, comprising a container for lubricant, a discharge tube reciprocable with respect to said container, means interposed between, and effecting operative communication between, said container and said discharge tube for forcing lubricant under pressure through said discharge tube when said container is reciprocated relatively to said discharge tube, means for causing lubricant to pass from said container to said forcing means, and means carried by the outer end of said discharge tube for making sealed contact with said receiving member from any one of a plurality of different angularly related positons, said sealed contact being maintained by the pressure exerted in moving said container relatively to said discharge tube.

25. A lubricant compressor comprising a cylindrical container, a pump cylinder of smaller diameter than said container and communicating with said container, said pump cylinder and container being coaxial, means, caused to act by a thrust exerted along the axis of said container, for discharging lubricant from said pump cylinder, means reciprocable with respect to said container and communicating therewith for conducting lubricant from said pump cylinder, and piston means in said container for continuously pressing against the lubricant in said container.

26. A lubricant compressor comprising a cylindrical container, a pump cylinder of smaller diameter than said container and communicating with said container, said pump cylinder and container being coaxial, means, caused to act by a thrust exerted along the axis of said container, for discharging lubricant from said pump cylinder, means for communicating with said container and conducting lubricant from said pump cylinder, and piston means in said container movable relatively to said pump cylinder for pressing against the lubricant in said container.

JOHN L. CREVELING.